United States Patent
Lee

(10) Patent No.: US 7,454,072 B2
(45) Date of Patent: Nov. 18, 2008

(54) IMAGE RECORDING AND COMPRESSION BASED ON SOUND DETECTION AND IMAGE CHANGE

(75) Inventor: Jae-Hoon Lee, Sungnam (KR)

(73) Assignee: Samsung Techwin Co., Ltd., Kyungsangnam-do (KR)

( * ) Notice: Subject to any disclaimer, the term of this patent is extended or adjusted under 35 U.S.C. 154(b) by 951 days.

(21) Appl. No.: 10/819,199

(22) Filed: Apr. 7, 2004

(65) Prior Publication Data

US 2005/0084172 A1 Apr. 21, 2005

Related U.S. Application Data

(62) Division of application No. 09/801,811, filed on Mar. 9, 2001, now Pat. No. 6,792,156.

(30) Foreign Application Priority Data

| Mar. 9, 2000 | (KR) | ............................ 2000-11835 |
| Mar. 31, 2000 | (KR) | ............................ 2000-17004 |

(51) Int. Cl.
*G06K 9/36* (2006.01)
*G06K 9/00* (2006.01)

(52) U.S. Cl. ........................ 382/239; 382/103

(58) Field of Classification Search ................ 382/239, 382/103

See application file for complete search history.

(56) References Cited

U.S. PATENT DOCUMENTS

| 5,184,219 A | 2/1993 | Cho |
| 5,253,275 A | 10/1993 | Yurt et al. |
| 5,534,927 A | 7/1996 | Shishikui et al. |
| 5,543,845 A | 8/1996 | Asamura et al. |
| 5,581,297 A * | 12/1996 | Koz et al. .................... 348/152 |
| 5,761,180 A * | 6/1998 | Murabayashi et al. ..... 369/53.44 |
| 5,802,220 A | 9/1998 | Black et al. |
| 5,886,743 A | 3/1999 | Oh et al. |
| 6,084,912 A | 7/2000 | Reitmeier et al. |
| 6,097,429 A * | 8/2000 | Seeley et al. ................. 348/154 |
| 6,226,414 B1 | 5/2001 | Go |
| 6,392,692 B1 * | 5/2002 | Monroe ....................... 348/143 |
| 2001/0043270 A1 * | 11/2001 | Lourie et al. ................. 348/155 |

FOREIGN PATENT DOCUMENTS

| JP | 08265616 A | * 10/1996 |
| KR | 100149938 B1 | 6/1998 |

* cited by examiner

*Primary Examiner*—Wenpeng Chen
(74) *Attorney, Agent, or Firm*—Finnegan, Henderson, Farabow, Garrett & Dunner, L.L.P.

(57) ABSTRACT

Disclosed is an input image data compressor which comprises an image recording controller for generating image information on respective input objects from the input image data, generating image information on a moving object using the image information, comparing the previously input image data with the presently input image data, generating new image information on the moving object and compressing the new image information; a storage unit for storing signals or data generated during compression operation of the image recording controller in a corresponding established address; and a compressed image storage unit for storing the compressed image data compressed by the control operation of the image recording controller.

2 Claims, 9 Drawing Sheets

IMAGE RECORDING AND COMPRESSION BASED ON SOUND DETECTION AND IMAGE CHANGE

This is a division of application Ser. No. 09/801,811, filed Mar. 9, 2001, now U.S. Pat. No. 6,792,156 which is incorporated in its entirety herein by reference.

BACKGROUND OF THE INVENTION (a) Field of the Invention

The present invention relates to a digital recording system (DRS). More specifically, the present invention relates to a digital image data compression device of a digital recording system.

(b) Description of the Related Art

A digital recording system stores and transmits image information in a digital format in replacement of an analog recording system. The digital recording system is applied to various fields using image transmission techniques such as video conferencing, unmanned store management systems and traffic control systems.

In order to effectively store a huge amount of digital image data, the digital recording system compresses, stores and transmits the image data and decompresses the transmitted data into original image data and outputs the same.

Techniques for compressing the digital image data include MPEG, MJPEG, JPEG, Wavelet and Fractal systems.

The MPEG and MJPEG systems for compressing moving pictures compare pixels of the image data of a previous image with those of a present image to compress the same, and accordingly, much compression time and huge storage capacity are needed.

Also, since the image information can be lost when decompressing the compressed image data, blocks of decompressed image data are generated, and therefore the image quality becomes deteriorated, and users should pay a lot of money to use the compression methods.

The Wavelet or Fractal techniques for compressing still images per frame reduce data processing time when compressing or decompressing the data, and since the blocks are not generated, the decompressed image is clear.

However, since they only compress still images and they cannot compress moving pictures, and since there is no international standard, compatibility problems occur.

Also, in the case the digital recording system is provided to an unmanned shop or unmanned bank, the digital recording system continues to operate and compresses and stores image data even when no particular events occur in the night because of few users.

Accordingly, because of the repeated compression process, the storage capacity of the storage device is unnecessarily spent, and because of the unnecessary storing process of identical images, the lifespan of the storage device is shortened.

SUMMARY OF THE INVENTION

It is an object of the present invention to provide a device and method for effectively compressing image data.

In one aspect of the present invention, a data compressor for compressing input image data comprises an image recording controller for generating image information on respective input objects from the input image data, generating image information on a moving object using the image information, comparing the previously input image data with the presently input image data, generating new image information on the moving object and compressing the new image information; a storage unit for storing signals or data generated during compression operation of the image recording controller in a corresponding established address; and a compressed image storage unit for storing the compressed image data compressed by the control operation of the image recording controller.

In another aspect of the present invention, in a data compression method using a data compressor for compressing input image data and storing the same in an information storage unit, a data compression method comprises (a) generating image information on a moving object from the image data and comparing the image information with previously input image data; (b) generating image information on a new moving object and generating approximated image information; and (c) compressing the image information on the new moving object and the generated approximated image information and storing the compressed data in the information storage unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
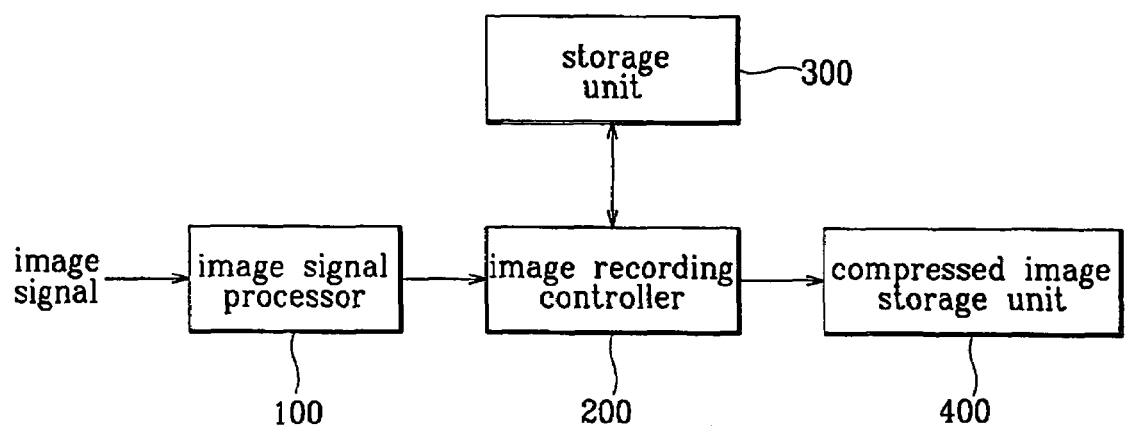
FIG. 1 shows a block diagram of a data compressor of a digital recording system according to a first preferred embodiment of the present invention.

FIG. 1 shows a block diagram of a data compressor of a digital recording system according to a first preferred embodiment of the present invention. As shown, the data compressor comprises an image signal processor 100 for receiving image signals, an image recording controller 200 connected to the image signal processor 100, a storage unit 300 connected to the image recording controller 200, and a compressed image storage unit 400.

The image signal processor 100 converts the input analog image signals into digital signals, performs image signal processing on the converted image signals, and outputs image data. The image recording controller 200 compresses and controls the image data output by the image signal processor 100. The storage unit 300 stores signals or data generated during the compression operation of the image recording controller 200 in corresponding addresses. The compressed image storage unit 400 stores the image data compressed by the image recording controller 200.

Figure 2:
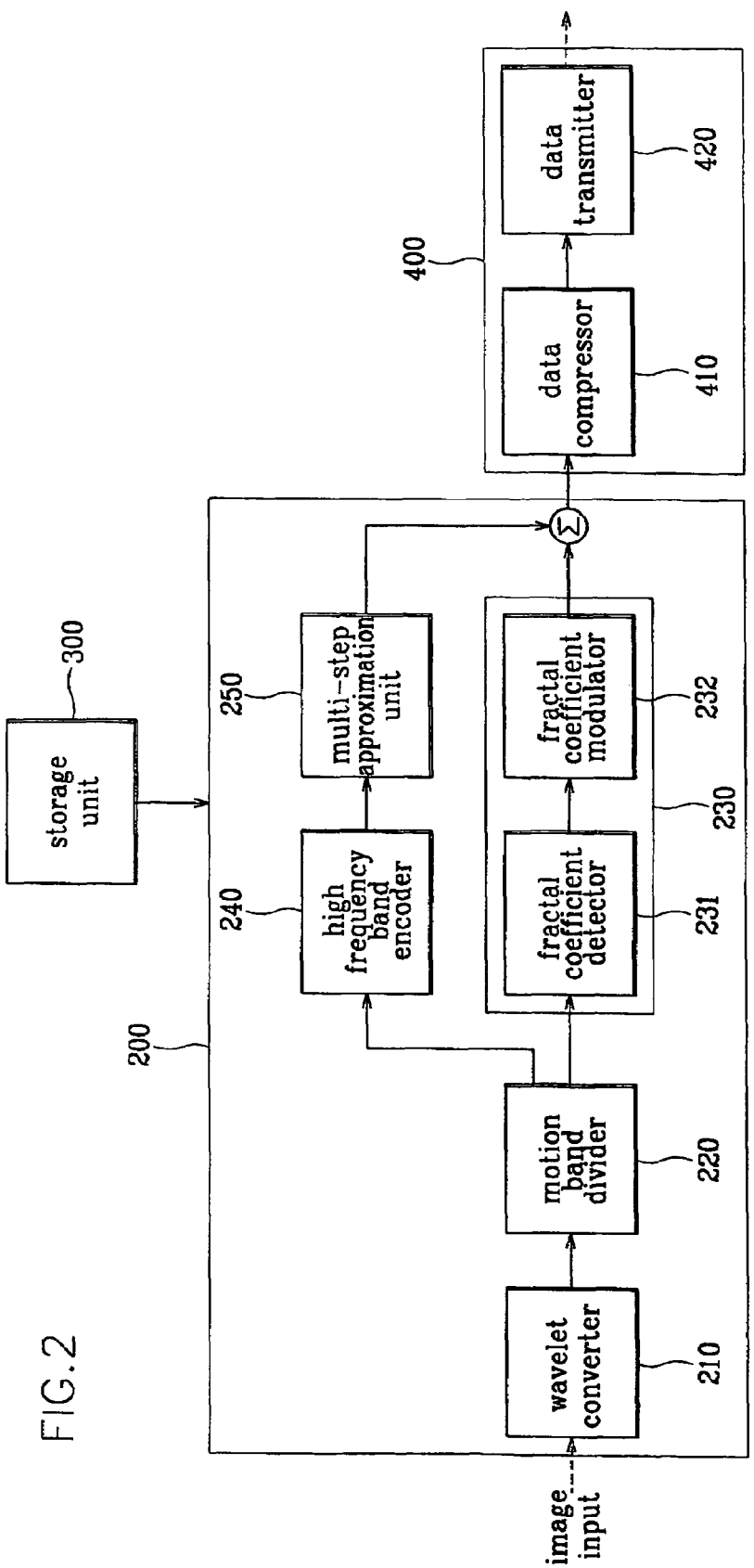
FIG. 2 shows a block diagram of an image compression signal processor of the digital recording system according to the first preferred embodiment of the present invention.

FIG. 2 shows a block diagram of an image compression signal processor of the digital recording system according to the first preferred embodiment of the present invention.

As shown, the image recording controller 200 comprises a wavelet converter 210 for converting input image data into frequency image components and dividing the same according to frequency bands; a motion band divider 220 for dividing the frequency bands into a low frequency band that has a great amount of motion information of the moving object of the images and a high frequency band that has a small amount of motion information of the moving object of the images; a motion detector including a fractal coefficient detector 231 for detecting motion information on the moving object of the images using the low frequency band, and a fractal coefficient modulator 232 for receiving a detection signal from the fractal coefficient detector 231 and modulating a difference value between the detection signal and the fractal coefficient detected from a previous image; a high frequency band encoder 240 for encoding a frequency of the high frequency band divided by the motion band divider 220; and a multi-step approximation unit 250 for receiving an output signal of the high frequency band encoder 240 and reducing a difference between a result value converted by the wavelet converter 210 and a frequency band before conversion.

The wavelet converter 210 configures unnecessary time and special repetition included in the input images in a hierarchical multi-resolution structure and removes the same.

The motion band divider 220 divides the images output by the wavelet converter 210 into a low frequency band's motion region that has many motions of an object and a high frequency band's non-motion region that has less motions of the object.

The fractal coefficient detector 231 detects a moving object of the image from the low frequency band divided by the motion band divider 220, quantifies the detected moving object, and outputs its coefficient.

The fractal coefficient modulator 232 generates a difference value between the fractal coefficient generated by a previously input image and that of a presently input image by using a differential pulse code modulation (DPCM) method.

The multi-step approximation unit 250 uses statistical repetition and approximates the difference between the actual converted results and pre-conversion frequency band in order to effectively display the original images.

The compressed image storage unit 400 comprises a data compressor 410 for making output values modulated by the fractal coefficient modulator 232 and those output by the multi-step approximation unit 250 into bit stream data, and a data transmitter 420 for storing output values compressed by the data compressor 410 and transmitting the same.

The data compressor 410 quantizes the data of the high frequency region and the low frequency region and compresses the quantized values.

The image recording controller 200 comprises a CPU, ROM, RAM and bus and is not restricted to the present invention.

An operation according to the first preferred embodiment will now be described referring to FIGS. 3 to 6.

Figure 3A:
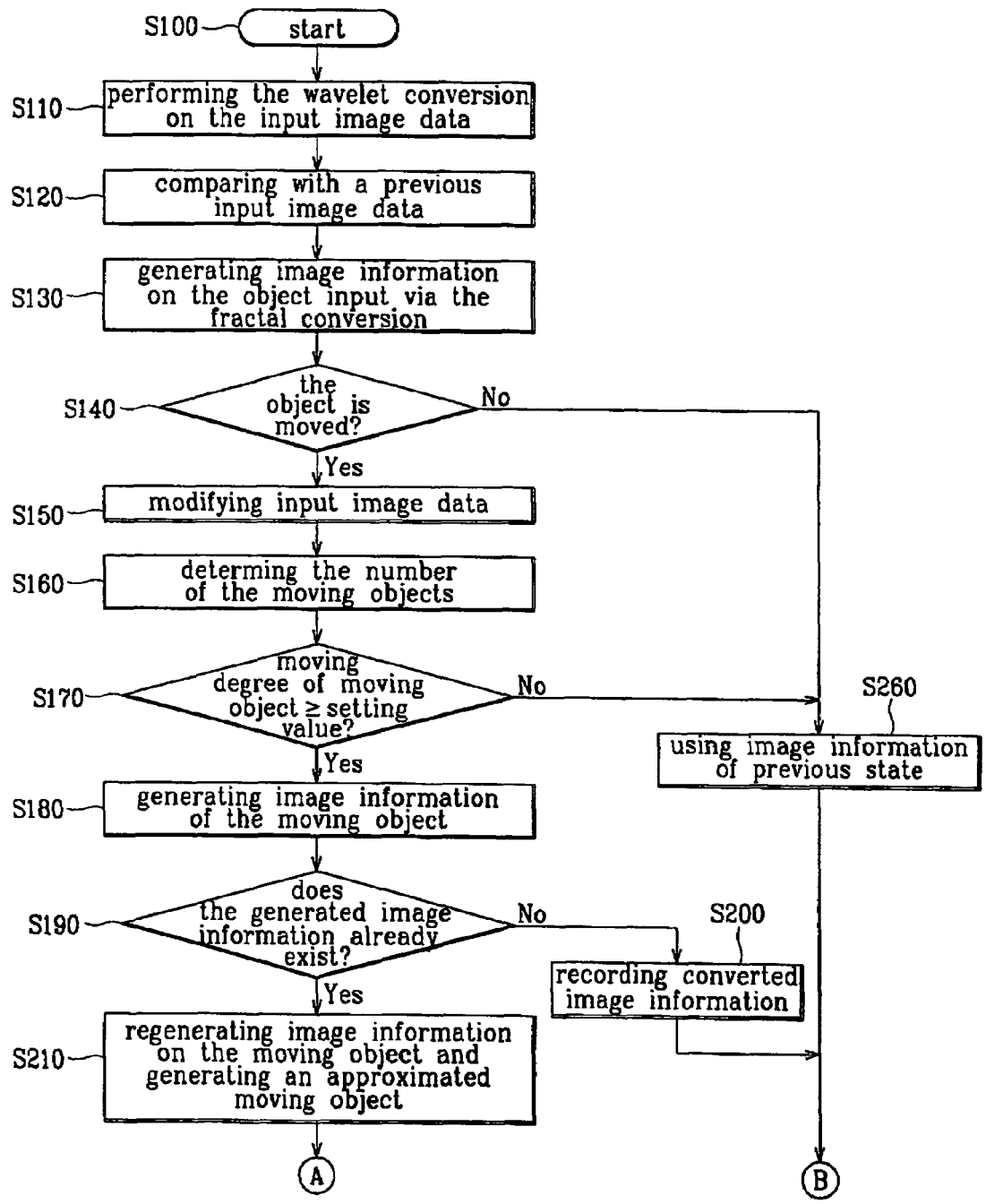
FIG. 3 shows a flow chart of a data compression control method of the digital recording system according to the first preferred embodiment of the present invention.
Figure 3B:
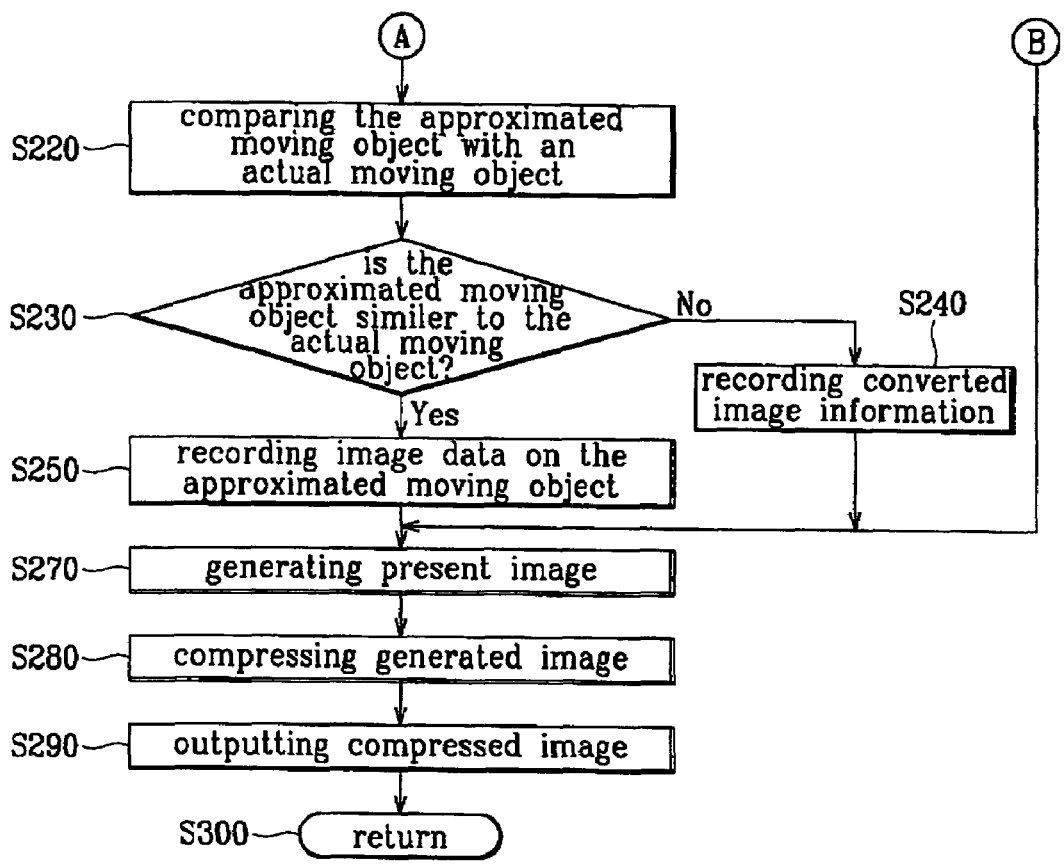
Figure 4:
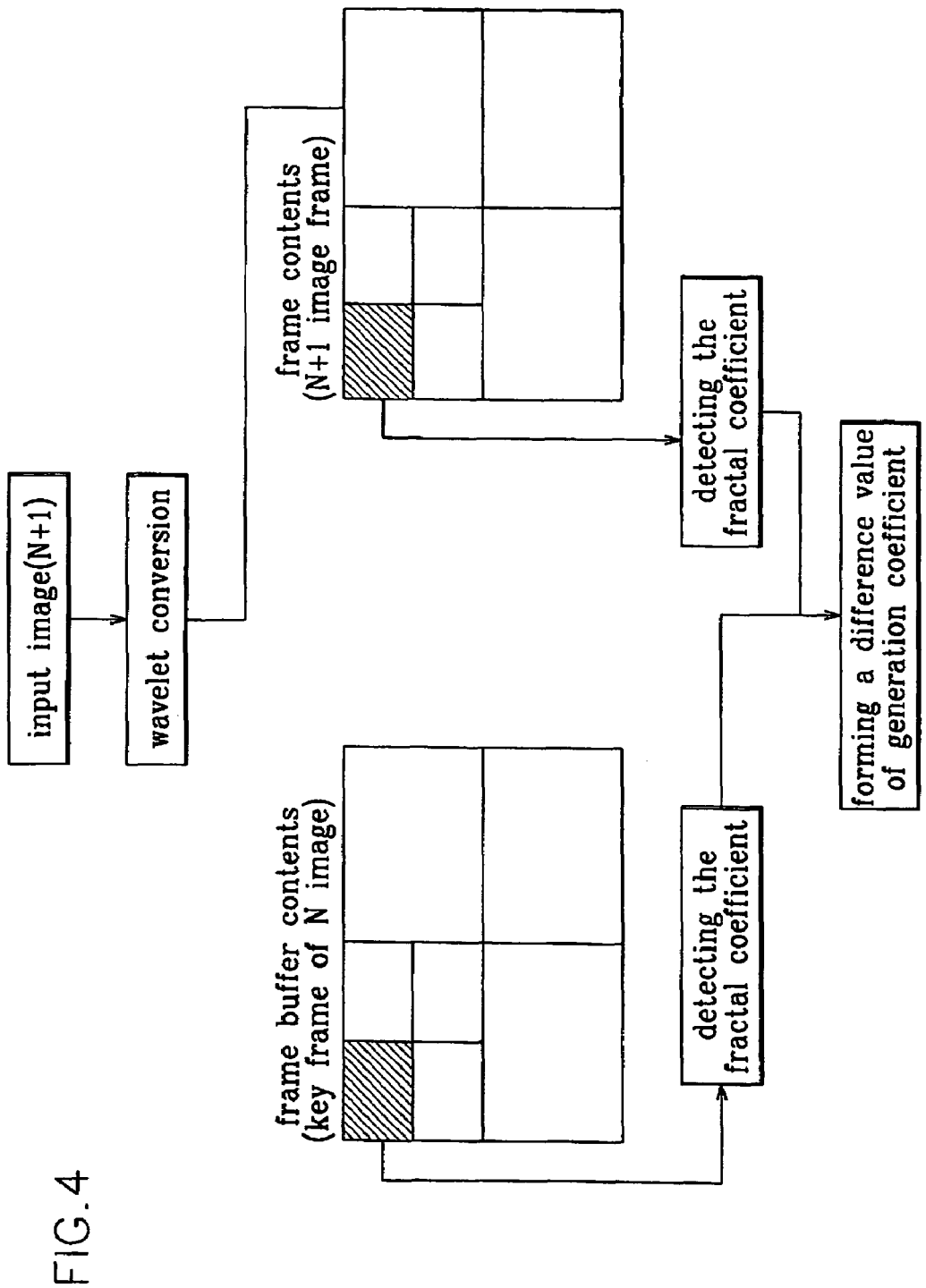
FIG. 4 shows a signal processing method of a motion detector of FIG. 1.
Figure 5:
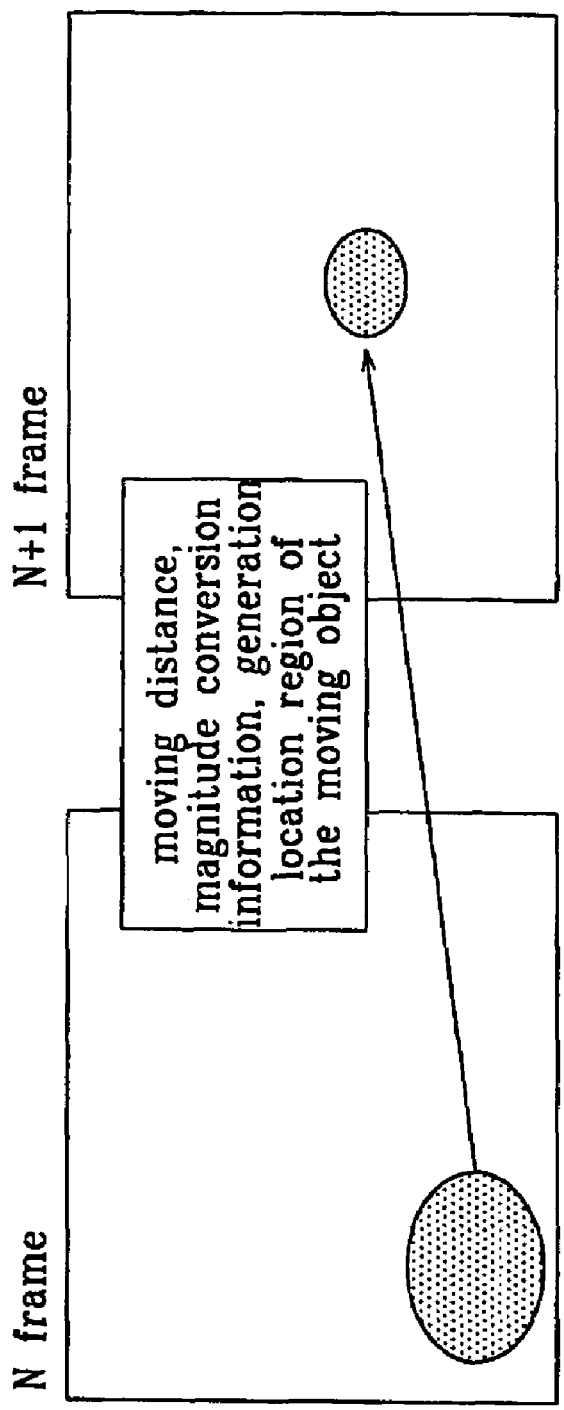
FIG. 5 shows a generation of a moving object.
Figure 6:
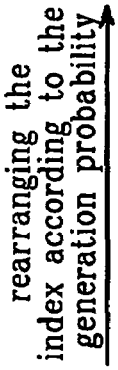
FIG. 6 shows recorded contents of a motion history index.

FIG. 3 shows a flow chart of a data compression control method of the digital recording system according to the first preferred embodiment of the present invention, FIG. 4 shows a signal processing method of a motion detector of FIG. 1, FIG. 5 shows a generation of a moving object, and FIG. 6 shows recorded contents of a motion history index.

First, the image signals are input to the image signal processor 100. At this time, the image signals are generated when a user takes a picture of a corresponding object using a pickup device such as the charge coupled device (CCD). The image signal processor 100 receives the analog image signals, converts the same into digital image signals, processes the digital image signals and outputs corresponding image data.

Hence, the image recording controller 200 controls the input image data to compress the same.

Referring to FIG. 3, an operation of the image recording controller 200 for compressing the image data will now be described.

When the operation starts in step S100, the image recording controller 200 reads the image data and divides the input image data into horizontal data, vertical data, and core image data of the input image data using the wavelet conversion method in step S110.

That is, as shown in FIG. 4, the wavelet conversion is performed on the input image (N+1) via the wavelet converter 210, and the converted image signals are input to the motion band divider 220 and divided into the low frequency band signals that have a lot of motion information on the moving object of the image and the high frequency band signals that have less amounts of motion information on the moving object of the image. The actually input image (N+1) is divided into low frequency component signals that have the greatest amount of information, and edge components including vertical edge components, horizontal edge components and diagonal edge components. In the input image (N+1), the region that has much motion of the moving object is mainly provided on the left top of the image by the wavelet conversion, and moving to the right bottom, the motion of the moving object is reduced. In other words, the left top area represents the low frequency band and the right bottom area indicates the high frequency band. The wavelet converter 210 repeats the wavelet conversion process on the input image (N+1). That is, the input image (N+1) signal is divided into the low and high frequency bands through the wavelet conversion, and the low frequency region is divided into the low and high frequency regions through the wavelet conversion. When this process is repeated, the initial input image (N+1) is continuously divided into the low frequency images, and at each wavelet conversion process, the high frequency components are repeatedly divided. The divided frequency bands are encoded according to respective bands. As described above, regarding the image divided by the wavelet converter 210 and the motion band divider 220 according to the frequency bands, when the motion band is the low frequency band that has the most motion information of the moving object of the image, the low frequency band is input to the fractal coefficient detector 231, and image information is detected.

The coefficient quantified by a motion vector of an object is input to the fractal coefficient modulator 232, and a difference value between the quantified coefficient and a fractal coefficient value obtained from a previous image N before the input of the present image is generated. At this time, the differential pulse code modulation (DPCM) is used to generate the difference value of the fractal coefficient.

Here, the DPCM will be explained. A general pulse code modulation (PCM) method encodes input signal values. That is, the maximum amplitude of a signal is assigned as the maximum bit. In this method, since the input signal is encoded during a sampling time, response characteristics are good, but in the case the signal is identical with the voice, since the maximum amplitude is not much higher than the average amplitude, the efficiency becomes bad. Therefore, when a value corresponding to a difference between a present sampling value and a next sampling value after a predetermined sampling time has elapsed is encoded, the efficiency becomes better since the number of bits is reduced compared to encoding the input signal.

Among the frequency bands divided by the motion band divider 220, the image signal of the high frequency band that has less motion information is encoded by the high frequency band encoder 240, and a difference between the image signal and the frequency band before conversion is approximated by the multi-step approximation unit 250.

Here, the multi-step approximation process will be described. The initial input image (N+1) is converted using the wavelet conversion, divided into the low and high frequency images, and the low frequency image is again divided into the low and high frequency images using the wavelet conversion, and as this method is repeated, the images are divided. Via this repetition, the signals are generated for respective frequency bands, and since the wavelet conversion is performed on the signals at the previous band signal, the signals have many similarities. Therefore, when the frequency areas are approximated for the respective frequency bands, that is, in the case the frequency band passing through the initial frequency band is provided to the next frequency band via the wavelet conversion, a relation on the difference between the actually converted results and the frequency band before conversion is generated. That is, the fractal approximation is performed on the frequency by using an equation that "the initial frequency=conversion equation (post-conversion frequency)+offset" in a method similar to the approximation of general images.

The image recording controller 200 compares the image data converted by the wavelet conversion with the previous image data stored in the corresponding address of the storage unit 300 in step S120, and generates image information of a motion history index needed for a motion history index table of FIG. 6 by using the fractal conversion for determining image information such as a generation location, size data, color and generation probability of the object in step S130.

As shown in FIG. 6, the motion history index comprises index numbers, object's moving distance, conversion information and generation region. The index numbers cover from 0 to N. The index 0 represents that the previously input frame is presently used since no moving object is found at the input present frame. The indexes 1 to N−1 represent that size conversion information of a motion vector that indicates a location of the moving object of the previous frame at the present frame after comparing the previous frame with the present frame, a generation probability of the location, and a moving distance of the moving object. The index N represents that the presently input images is used.

When the image information generation step S130 is finished, the image recording controller 200 detects whether a moving object is generated at the previous image in step S140.

When the moving object is found, the image recording controller 200 stores the presently input image data in the corresponding address of the storage unit 300, converts the previous image data stored in the storage unit 300 or a buffer into the presently input image data in step S150, determines the number of moving objects in step S160, and compares moving degree of the respective moving objects with previously established values in step S170.

When the moving degree of the moving objects is modified greater than the previously established values, the image recording controller 200 determines that the corresponding object has been moved.

However, if the moving degree is not greater than the previously established values, the image recording controller 200 determines that the corresponding object has not been moved since the moving degree is low.

Therefore, the previous state image information is used in step S260.

However, when an object that has a moving degree greater than the established values is generated when comparing the previous image with the presently input image, the image recording controller 200 determines that a moving object is generated, and outputs image information on the moving object in step S180.

That is, the low frequency band's image divided by the motion band divider 220 is input to the fractal coefficient detector 231, and the input image (N+1) is compared with a key frame of the previous image (N) stored in the storage unit 300 (or a frame buffer). When the moving object is detected after comparing the input image (N+1) with the key frame of the previous image (N) in step S150, the fractal coefficient detector 231 sets the detection number of the moving object and compares the same with a reference value.

At this time, when the detection number of the moving object is greater than a reference value, a key frame is established and stored in the storage unit 300 (or the frame buffer), and the key frame of the memory 300 becomes a reference value for comparing the motion of a subsequently input image. When the detection number of the moving object is less than the reference value after the comparison with the key frame of the previous image, the image recording controller 200 detects motion information on the moving object at the input image (N+1). Here, as shown in FIG. 5, the motion information represents generation of the moving object, size conversion information of the moving object and moving distance of the moving object, and relates to information on the motion vector of the moving object.

Next, it is determined whether image information generated in the previous step S130 on the moving object exists in the motion history index table in step S190.

When the image information exists in the motion history index table as identical values, the image recording controller 200 determines that only the location of the identical object is modified.

Accordingly, the image recording controller 200 records converted image information such as modified location information, generation region and generation probability among the history index information in step S200, and in the case the image information is identical with that of the previous state, uses the previous state image information.

However, when no image information on the moving object exists in the motion history index information, the image recording controller 200 determines that a new object is generated.

Accordingly, the image recording controller 200 again outputs image information on the newly generated object, and generates an approximated moving object using the output image information in step S210.

Next, the output approximated moving object is compared with the presently input actual object corresponding to the input image data in step S220 and it is determined whether they are similar objects in step S230. That is, when the motion history index is searched and no similar motion information exists, an approximated image is generated and the input actual image and the approximated image are compared. That is, information is obtained from the motion history index and an approximation on the new moving object is implemented. After this, the moving distance, motion information and generation region among the initial motion history index information are repeatedly modified and repetition computation is performed to track the most similar motion object. This process is referred to as the fractal approximation, through which the motion object is generated via the three parameters of the moving distance, motion information and generation region, and the motion object is compared with the actual image.

When it is determined that the approximated object is similar to the actual object, the image recording controller 200 records image information on the output approximated object on the motion history index table in step S240. That is, when the input image (N+1) and the approximated image are compared and they are found to be similar to each other, motion information on the motion object is recorded and stored in the motion history index. In other words, information on the approximated moving object is generated by finding conversion information and moving distance from the moving object of the previous frame, and the conversion information, moving distance and motion information of the generation region are recorded on the motion history index, and the length of the motion history index is variably modified according to the generation states of the moving object and the number of the generated moving objects.

However, when the compared approximated object and the actual object are not similar, since the approximated object is a new image, the image recording controller 200 records the image data corresponding to the approximated object on the motion history index table in step S250. That is, when the image (N+1) and the approximated image are not similar, the fractal coefficient detector 231 encodes the index number N that indicates to use the present image from the motion history index information and configures a new image.

As shown in FIG. 6, the index value of the motion history index table at this time is set to be "N" to report that a new object is generated.

As described above, when a moving object is generated on the present image data at the time of comparing with the previous image data, the image recording controller 200 outputs image information on the moving object so as to generate an approximated image corresponding to the actual input image.

However, when no moving object is generated at the image data corresponding to the input image compared to the image data of the previous image in the step S140, the image recording controller 200 determines that no previous image and converted image exist.

Therefore, so as to use the image data corresponding to the previous image, the image recording controller 200 records a frame check bit assigned to a corresponding address of the storage unit 300 as an establishment value, and hence, in the case of implementing the present image, the previous image information can be used without an additional image generation operation in step S260. That is, when the initial input image (N+1) and the key frame of the previous image (N) are compared and no moving object is detected, the fractal coefficient detector 231 generates a single-bit information for indicating re-use of the key frame of the previous image stored in the storage unit 300 (or a frame buffer), stores the generated one-bit information and configures a new image. At this time, the new image uses the key frame of the previous image.

As shown in FIG. 6, the index value of the motion history index table at this time is set as "0" to report that the previous image information is used with an object identical to the previous object.

In the preferred embodiment of the present invention, when no moving object is generated in the step S140, since the motion history index table rearranges the indexes in order of high generation probability, the image recording controller 200 sequentially searches the objects in order of high generation probability and determines the moving states of the objects, the searching time can be reduced.

For example, when no moving object is generated at the input present frame, the motion history indexes generated up to now are rearranged so that the motion history index information of the most probable generation is positioned on top and that of less probable generation is positioned on bottom according to the generation probability of the moving object. In other words, if the size of the previous motion history index totals 100, since motion is detected from the present image and this motion information increases, the size of the motion history index becomes 101, and when this case continues to occur, the motion history index increases to values such as 102 and 103. However, since the size of the motion history index cannot be increased unlimitedly, when no motion occurs, as shown in FIG. 4, the motion history index is rearranged, and hence, generation probabilities of all kinds of information on the motion history index are found, and information starts to be deleted from the motion history index in order from the least generation probability. Referring to the motion history index of FIG. 5, the moving distance represents coordinates of a screen, and the conversion information and generation region indicate sizes of motion vectors.

When a moving object is generated at frames to be subsequently input and searched at the motion history index through this rearranged motion history index, since the motion history index is searched in order from the most probable motion history index, the search success possibility can be increased. Also, the encoding time can be reduced via this rearrangement. After motion information is recorded in the motion history index, a new image is configured, and at this time, only the searched motion history index number is encoded to configure a new image.

As described above, when the image information on the moving object of the presently input image data is generated, the image recording controller 200 generates a presently input image in step S270. That is, the image recording controller 200 generates a presently input image by using image data on the total images stored in the corresponding addresses of the storage unit 300, information on the generated motion history index and image information on the newly generated object.

Next, the image recording controller 200 compresses the generated image and outputs the same to the compressed image storage unit 400 in steps S280 and S290.

The compressed image storage unit 400 sequentially stores the compressed images output by the image recording controller 200 in corresponding addresses.

Therefore, the compressed image storage unit 400 sequentially stores the compressed images of the input moving pictures in the corresponding addresses, and when decompressing the compressed images, outputs the compressed images stored in the corresponding address and decompresses the same using index information. That is, the output values wherein the motion is detected by the fractal coefficient modulator 232 and the output values approximated by the multi-step approximation unit 250 are formed into compressed bit stream data by the data compressor 410, and the compressed output values are temporarily stored in the data transmitter 420, and then transmitted and decompressed.

As described above, the digital image recording device of the present invention reduces excessive encoding time generated when encoding the images, and efficiently compresses the image information using good techniques of individual compression algorithms.

Figure 7:
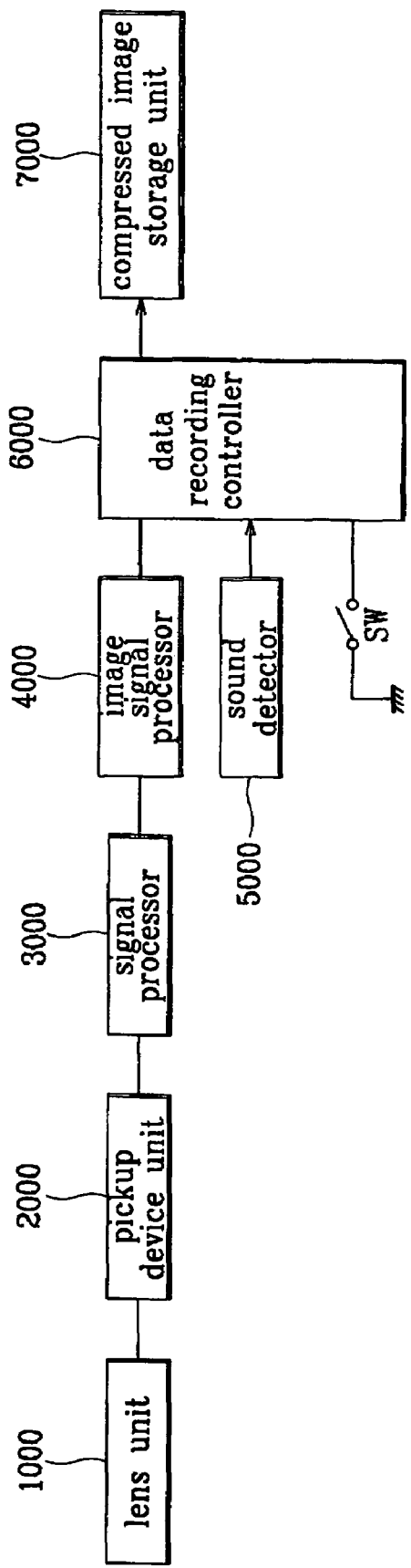
FIG. 7 shows a block diagram of a data compressor of a digital recording system according to a second preferred embodiment of the present invention.
Figure 8:
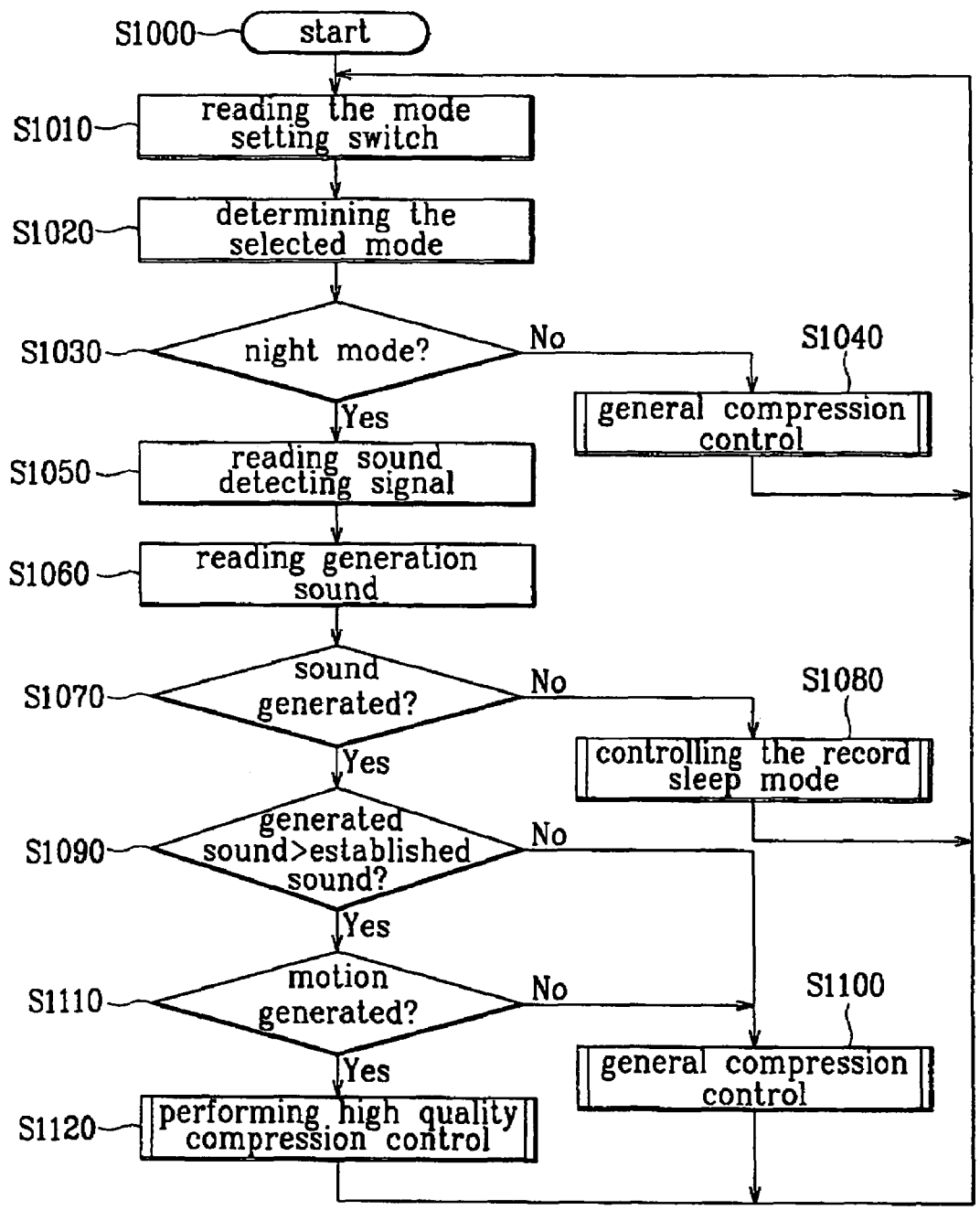
FIG. 8 shows a flow chart of a data compression control method of the digital recording system according to the second preferred embodiment of the present invention.

Referring to FIGS. 7 and 8, a data compressor of a digital recording system and its control method according to the second preferred embodiment of the present invention will be described.

FIG. 7 shows a block diagram of a data compressor of a digital recording system according to a second preferred embodiment of the present invention, and FIG. 8 shows a flow chart of a data compression control method of the digital recording system according to the second preferred embodiment of the present invention.

As shown in FIG. 7, the data compressor of a digital recording system according to the second preferred embodiment of the present invention comprises a lens unit 100*b*; a pickup device unit 2000 for receiving images that are formed on the lens unit 1000; a signal processor 3000 for receiving outputs from the pickup device unit 2000; an image signal processor 4000 for receiving output signals from the signal processor 3000; a sound detector 5000 for detecting sound and outputting the same; a mode setting switch SW for selecting an operation mode; a data recording controller 6000 connected to the image signal processor 4000, the sound detector 5000 and the mode setting switch SW; and a compressed image storage unit 7000 for receiving outputs from the data recording controller 6000.

When the lens unit 1000 forms an image of a subject for photography (not illustrated), the pickup device unit 2000 receives the image formed by the lens unit 1000 and generates corresponding electrical image signals. The signal processor 3000 removes noises in the image signals output by the pickup device unit 2000, amplifies weak signals, converts analog signals into digital signals, and outputs results to the image signal processor 4000.

The image signal processor 4000 processes the input image signals and outputs the image data to the data recording controller 6000.

Also, the sound detector 5000, comprising high performance speakers, detects sound and outputs the same to the data recording controller 6000.

The mode setting switch SW selects a day mode or a night mode as the operation mode of the data recording system by a user and outputs corresponding state signals.

The data recording controller 6000 comprises a central processing unit (CPU), ROM, RAM and an analog-to-digital converter, and controls image compression states by using sound generation states and image moving degrees when the night mode is selected by using image data of respective frames input by the image signal processor 4000 and signals input by the sound detector 5000 and the mode setting switch SW.

The compressed image storage unit 7000 comprises a hard disk drive or an optical disk, and the data recording controller 6000 stores the compressed images in the corresponding address.

Referring to FIG. 8, an operation according to the second preferred embodiment will be described.

As shown in FIG. 8, when power is supplied, the operation starts in step S1000, and the signal input by the mode setting switch SW is read in step S1010. States of the signals provided by the mode setting switch SW are read in step S1020, and it is determined whether the operation mode selected by the user is a night mode or a day mode in step S1030.

When the operation mode is found to be the night mode, the data recording controller 6000 reads the signals output by the sound detector 5000 in step S1050 and determines whether the sound is generated from the outside in steps S1060 and S1070.

However, when the operation mode is found to be the day mode, the data recording controller 6000 performs a general compression control in step S1040, and sequentially stores the compressed images in the corresponding addresses of the compressed image storage unit 7000.

When it is found that the operation mode is the night mode and no sound is generated by the signal output by the sound detector 5000 in the previous step S130, the data recording controller 6000 determines that surroundings are not changed.

Accordingly, the data recording controller 6000 reads only the signals input by the image signal processor 4000, and is switched to a record sleep is mode for not performing compression control in step S1080, and does not perform the compression control on the input image signals until the surroundings are found to be changed.

However, when the sound is found to have been generated by the signal output by the sound detector 5000, the data recording controller 6000 determines whether the magnitude (dB) of the generated sound is greater than a predetermined magnitude in step S1090.

When the magnitude (dB) of the sound is not greater than the predetermined magnitude, the data recording controller 6000 compresses the image data input via the image signal processor 4000, and stores the compressed image data in the compressed image storage unit 7000 in step S1100.

However, when the magnitude (dB) of the sound is greater than the predetermined magnitude, the data recording controller 6000 compares the image data of the present frame output by the image signal processor 4000 with the image data of the previous frame stored in a storage unit such as a RAM, and determines whether the image data are changed and motion of the photographed image is generated in step S1110.

When no difference between the two compared image data is generated, the data recording controller 6000 determines that no motion is generated between the image of the previous frame and that of the presently photographed frame. Hence, the data recording controller 6000 compresses the image data and stores the compressed images in the compressed image storage unit 7000 in step S1100.

However, changes between the image data of the previous frame and the image data of the present frame are generated, the data recording controller 6000 determines that a motion is generated at the photographed image.

Therefore, the data recording controller 6000 controls the compression states via a fine mode to control the compression control more precisely than a normal mode, and stores the image in the compressed image storage unit 7000.

Accordingly, when reproducing the images, a screen analysis on the images with generated motions can be easily and correctly executed by the decompressing operation.

According to the present invention, it is not necessary to compress all the generated images and compare the respective generated image data with the previous image data, and further, the present invention generates the present image only using information converted from the previous image and compresses the present image, and when there is no change between the present and previous images, the present invention uses the previous image, and hence, the compression time is shortened, signal processing efficiency and compression efficiency are improved, and necessary storage capacity is also reduced.

Also, since conventional compression methods are not used, unnecessary use cost is reduced.

Also, since unnecessary compression control at night is prevented, unnecessary capacity reduction of the storage device is prevented, and the lifespan of the storage device is increased.

Further, the present invention can be effectively applied to the following fields.

First, a composite multimedia system for VCR recording products that uses conventional analog storage methods, providing a convenient image search function, providing an image database, providing no deterioration of stored images under long-term storage, and using an input/output device such as an automatic teller machine (ATM), external sensor or home automation device can be built.

Second, by storing multi-channel camera input images using a camera, transmitting data to a remote place via a modem, integrated service digital network (ISDN), or asynchronous transfer mode (ATM), and installing the present invention system at a host and local area in cooperation with the Internet, a system for remote control and remote data transmission can be built and applied to a video telephone system, a remote medical treatment, a remote education system and a video conference system.

Third, since the image data can be more easily stored, searched and managed according to the present invention, the present invention can be applied to a bank's check management system to determine counterfeit checks, and it can also be applied to a finger print identification system.

Fourth, the present invention can be applied to information storing and monitoring systems such as an automatic navigation system, a monitoring system of an unmanned shop, a conference recording system, a traffic management system of an airport or a terminal, an environment monitoring system, military installations, and factory assembly lines.

Fifth, the digital recording system (DRS) according to the present invention can be a core device of a closed circuit television (CCTV) system, and since software and options can be greatly varied according to users' requirements compared to single body products, fast maintenance and high reliability can be achieved via a remote bi-directional information transmission.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A data compression controller, comprising:
   a photographing unit for photographing an image of a subject using a pickup device unit and outputting corresponding image signals;
   an image signal processor for outputting processed digital image data by removing noise from the image signals and amplifying weak signals from the image signals;
   a sound detector for detecting sound and outputting a sound detection signal to a data recording controller when the sound detector detects a generated sound;
   the data recording controller for compressing the image data output by the image signal processor when a sound detection signal is received and for determining whether a received sound detection signal is greater than a predetermined sound level,
   wherein when the received sound detection signal is greater than the predetermined sound level, the data recording controller compares the processed digital image data of a previous frame with the processed digital image data of a present fame and determines whether the processed digital image data has changed, wherein, if the processed digital image data between the processed digital image data of a previous frame and the processed digital image data of a present fame has changed, the data recording controller performs a high quality compression; and
   a compressed image storage unit for storing the compressed images output by the data recording controller.

2. A data compression control method comprising:
   removing noise and amplifying weak signals from input image data to output processed digital image data;
   determining whether a sound is generated by a sound detecting signal;
   performing a compression control on the input image data when it is determined that the sound is generated;
   determining whether the generated sound is greater than a predetermined sound level;
   comparing the image data of the present frame with the image data of the previous frame to determine if the image data has changed when the generated sound is greater than the predetermined sound level;
   performing a high quality compression control when the image data between the present frame and the previous frame has changed; and
   not performing the compression control on the input image data when the sound is not generated.

* * * * *